United States Patent
Choi et al.

(10) Patent No.: US 7,924,762 B2
(45) Date of Patent: Apr. 12, 2011

(54) RETRANSMISSION APPARATUS USING IP MULTICASTING METHOD FOR DMB SERVICE

(75) Inventors: Jeong-Seok Choi, Seoul (KR); Young-Hun Joo, Yongin-si (KR); Yong-Deok Kim, Seoul (KR); Kyung-Ho Chae, Seoul (KR); Yun-Je Oh, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 382 days.

(21) Appl. No.: 11/644,552

(22) Filed: Dec. 22, 2006

(65) Prior Publication Data

US 2007/0165628 A1 Jul. 19, 2007

(30) Foreign Application Priority Data

Jan. 17, 2006 (KR) .................. 10-2006-0004961

(51) Int. Cl.
*H04B 7/14* (2006.01)
*H04J 1/10* (2006.01)
*H04J 3/26* (2006.01)
*H04J 3/16* (2006.01)
*H04J 3/04* (2006.01)
*H04L 12/28* (2006.01)
*H04N 7/01* (2006.01)
*H04N 7/00* (2011.01)
*H04N 7/12* (2006.01)

(52) U.S. Cl. .................. 370/315; 370/390; 370/395.64; 370/432; 370/466; 370/535; 348/441; 348/486; 348/487

(58) Field of Classification Search .................. 370/312, 370/315–350, 390, 432, 395.64, 465–467, 370/535; 348/384.1–390.1, 441, 486–490
See application file for complete search history.

(56) References Cited

U.S. PATENT DOCUMENTS

2002/0093982 A1* 7/2002 Joy et al. .................. 370/468
2003/0035424 A1* 2/2003 Abdollahi et al. ........... 370/392
(Continued)

OTHER PUBLICATIONS

Smaedi, Error Recovery Service for IEEE 802.11B Protocols via Adaptive Forward Error Correction and Dynamic Packet Sizing, May 2004, IEEE Xplore, 4 pages.*
(Continued)

*Primary Examiner* — Alpus H Hsu
*Assistant Examiner* — Jeremy Costin
(74) *Attorney, Agent, or Firm* — Cha & Reiter, LLC (57) ABSTRACT

A retransmission apparatus using an IP multicasting method for a DMB service including a plurality (n) of radio frequency (RF) receivers, each for receiving a DMB RF signal of a corresponding channel, a plurality (n) of DMB decoders, each for outputting a transport stream (TS) by decoding the DMB RF signal received from a corresponding RF receiver, a plurality (n) of slicers, each for processing the TS input from a corresponding DMB decoder; a plurality (n) of network interfacers, each for IP packetizing the TS sliced by a corresponding slicer; a network switch for receiving the IP packets from the plurality (n) of network interfacers, transferring the received IP packets to a multicasting processing unit, and receiving multicasting data from the multicasting processing unit, and the multicasting processing unit for receiving the IP packets from the network switch, creating a single piece of multicasting data by assigning multicasting addresses to the received IP packets, and outputting the created multicasting data to the network switch.

12 Claims, 5 Drawing Sheets

U.S. PATENT DOCUMENTS

| | | | |
|---|---|---|---|
| 2005/0047448 A1* | 3/2005 | Lee et al. | 370/536 |
| 2006/0039483 A1* | 2/2006 | Lee et al. | 375/240.28 |
| 2006/0062200 A1* | 3/2006 | Wang et al. | 370/352 |
| 2006/0114857 A1* | 6/2006 | Czaja et al. | 370/335 |
| 2006/0291386 A1* | 12/2006 | Jyske et al. | 370/230 |
| 2007/0086458 A1* | 4/2007 | Narayanan et al. | 370/390 |
| 2007/0147409 A1* | 6/2007 | Kallio et al. | 370/431 |

OTHER PUBLICATIONS

Liu et al., Dynamic Packet Size in Broadband Networks, Dec. 1996, Division of Telecommunications and Industrial Physics, 6 pages.*

* cited by examiner

RETRANSMISSION APPARATUS USING IP MULTICASTING METHOD FOR DMB SERVICE

CLAIM OF PRIORITY

This application claims the benefit of the earlier filing date, pursuant to 35 U.S.C. §119, to that patent an application entitled "Retransmission Apparatus Using IP Multicasting Method for DMB Service," filed in the Korean Intellectual Property Office on Jan. 17, 2006 and assigned Serial No. 2006-4961, the contents of which are incorporated herein by reference.

BACKGROUND OF THE INVENTION

1. Field of the Invention

The present invention relates to Digital Multimedia Broadcasting (DMB), and in particular, to an apparatus for transforming Internet Protocol (IP) format DMB data and retransmitting the transformed DMB data to support a DMB service to a device that does not support the DMB service.

2. Description of the Related Art

Digital Multimedia Broadcasting (DMB) is a system, available on the market of Korea, used to provide a multimedia broadcasting service containing video based on Digital Audio Broadcasting (DAB: Eureka-147). DAB is a digital radio broadcasting standard used in Europe to simultaneously provide a compact disk (CD)-level high quality audio service and a data service.

Figure 1:
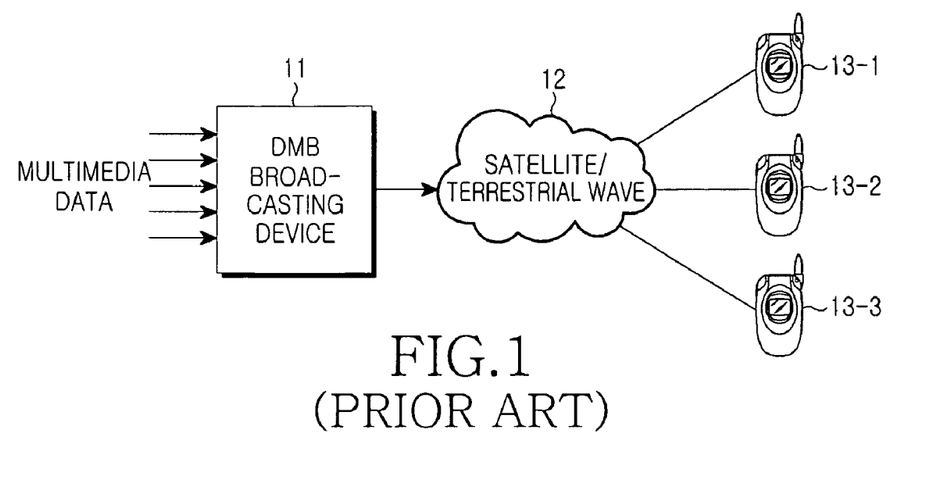
FIG. 1 is a schematic configuration of a conventional DMB system.

FIG. 1 is a schematic configuration of a conventional DMB system.

Referring to FIG. 1, the conventional DMB system includes a DMB broadcasting device 11, a satellite/terrestrial wave 12 and a plurality of DMB receiving devices 13-1, 13-2, and 13-3. The broadcasting device 11 receives multimedia data from content providers (not shown), forms DMB data for DMB transmission from the received multimedia data, and transmits the DMB data to the satellite/terrestrial wave 12. The satellite/terrestrial wave 12 is a transfer medium through which the DMB data transmitted from the DMB broadcasting device 11 is transferred. The DMB receiving devices 13-1, 13-2, and 13-3 receive the DMB data transferred via the satellite/terrestrial wave 12 and outputs multimedia data.

The DMB broadcasting device 11 includes (1) a broadcasting center (not shown) receives produced multimedia data from content providers and forms DMB data for DMB transmission, (2) transmission facilities (not shown) for transmitting the DMB data formed by the broadcasting center, and (3) gap fillers (not shown) for re-transmitting the DMB data to remove DMB broadcasting shadow areas (areas in which DMB broadcasting signals are insufficient for reception). DMB broadcasting is well-known in the art and need not be provided in greater detail herein to describe the principles of the invention.

The DMB receiving devices 13-1, 13-2, and 13-3 include vehicle DMB terminals and portable DMB terminals.

The DMB system illustrated in FIG. 1 includes both satellite DMB (S-DMB) and terrestrial DMB (T-DMB), and thus it has been described that a transfer medium includes both a satellite and a terrestrial wave.

Generally in order to receive a DMB-based multimedia service, a user must have a DMB terminal. However, it is unreasonable for every subscriber to buy a relatively expensive DMB terminal. However, DBM interface apparatuses and methods using an IP method are being developed whereby a DMB service can be received using widely used existing devices for processing packet type data. For example, a wireless local area network (WLAN) terminal, a Bluetooth terminal, or a $3^{rd}$ generation (3G) terminal supports a mobile network.

However, these DBM interface apparatuses and methods using an IP method are adversely effected by the errors that may occur in the medium. For example, if many errors occur in an occupied wireless channel, a user cannot receive a broadcasting service corresponding to a desired level according to a characteristic of the DBM interface in which continuous data transmission is important.

When data is transmitted using a wireless channel, it is important that the data is transmitted with packet length having the best transmission efficiency for the transmitting channel according to a characteristic of a wireless channel environment. In terms of transmission efficiency, the longer the packet length, the better. However, in the wireless channel environment in which many errors occur in a channel, as a probability of transmission failure increases as the packet length increases. Thus, it is necessary to select a proper packet length in the selected wireless channel environment. In order to effectively interface an image signal with a wireless network, it is important to encode the image signal in a manner suitable for a wireless channel is required.

SUMMARY OF THE INVENTION

The present invention provides a retransmission apparatus using an IP multicasting method for a DMB service, whereby image data can be transmitted in a wireless channel environment in which many errors occur, by adjusting the length of a video signal of a terrestrial DMB signal based on a packet length selected according to a characteristic of a wireless channel using an IP multicasting protocol and performing IP multicasting of the length-adjusted video signal.

According to one aspect of the present invention, there is provided a retransmission apparatus using an IP multicasting method for a DMB service, the retransmission apparatus comprising a plurality (n) of radio frequency (RF) receivers, each for receiving a DMB RF signal of a corresponding channel, a plurality (n) of DMB decoders, each for outputting a transport stream (TS) by decoding a DMB RF signal of a channel received from a corresponding RF receiver, a plurality (n) of slicers, each for processing the TS input from a corresponding DMB decoder, a plurality (n) of network interfacers, each for IP packetizing the TS sliced by a corresponding slicer, a network switch for receiving the IP packets from the plurality (n) of network interfacers, transferring the received IP packets to a multicasting processing unit in a downstream direction, and receiving multicasting data from the multicasting processing unit in an upstream direction; and the multicasting processing unit receiving the IP packets from the network switch, creating a single multicasting data stream by assigning multicasting addresses to the received IP packets, and outputting the created multicasting data stream to the network switch.

BRIEF DESCRIPTION OF THE DRAWINGS

The above features and advantages of the present invention will become more apparent from the following detailed description when taken in conjunction with the accompanying drawing in which.

DETAILED DESCRIPTION

Exemplary embodiments of the present invention will be described herein below with reference to the accompanying drawings. For the purposes of clarity and simplicity, well-known functions or constructions are not described in detail as they would obscure the invention in unnecessary detail.

Figure 2:
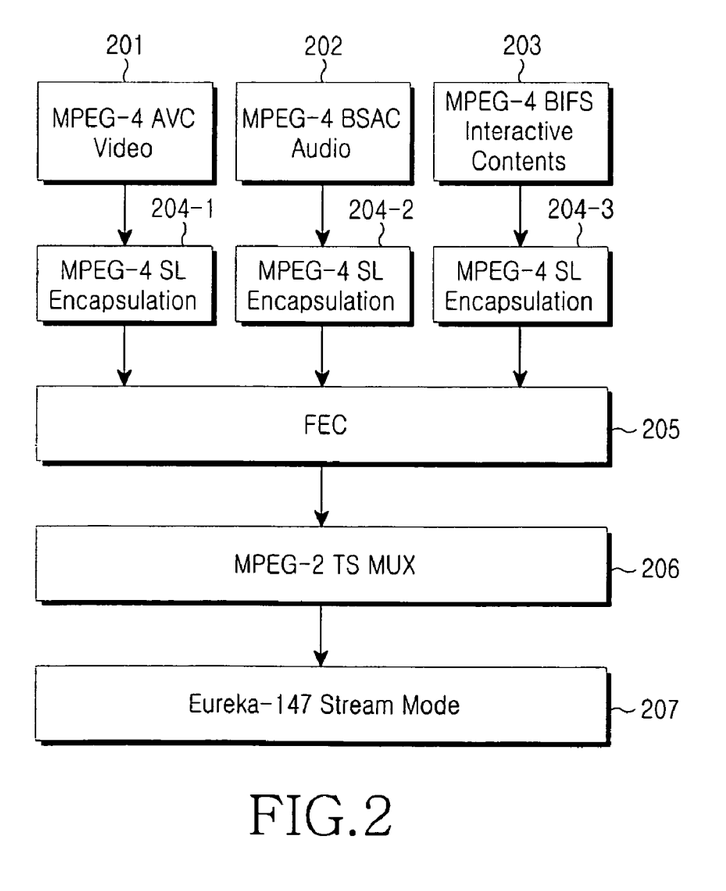
FIG. 2 illustrates a hierarchical structure for DMB data transmission in a DMB system.

FIG. 2 illustrates a hierarchical structure for DMB data transmission in a DMB system.

In terms of compression method, video data is compressed using a Motion Picture Expert Group (MPEG)-4 Part 10 Advanced Video Coding (AVC) (H.264) in step 201. H.1.264 coding is a well-known up-to-date compression technique guaranteeing the best efficiency and performance among existing video compression techniques. When data having a low data rate and a small image size, such as DMB data, is compressed and transmitted, the performance of H.264 is much better than other existing compression techniques. Thus, H.264 has been established as a video standard of T-DMB and S-DMB systems in Korea.

Audio data is compressed using an MPEG-4 Bit Sliced Arithmetic Coding (BSAC) method for T-DMB or an "Advanced Audio Codec +" (AAC+) method for S-DMB in step 202. The MPEG-4 BSAC method, which is one of many audio data compression methods, has a compression performance similar to other audio data compression methods and has a characteristic that a data rate can be easily changed. The preferred embodiments of the present invention are described based on T-DMB. However, it would be recognized by those skilled in the art that the principles described herein are also applicable to AAC+ coding.

Data information is compressed in an MPEG-4 Binary Format for Scenes (BIFS) interactive content format in step 203.

Each of the video, audio, and data information is encapsulated to an MPEG-4 Synchronization Layer (SL) in step 204-1, 204-2, or 204-3, respectively.

The encapsulated information is Forward Error Correction (FEC) encoded to be able to recover transmission errors in step 205.

The FEC processed video, audio, and data information is multiplexed to an MPEG-2 TS in step 206. An MPEG-2 TS packet is comprised of a TS packet header and a payload of a Packetized Elementary Stream (PES) packet. In particular, the TS packet header includes a Packet Identifier (PID) field, which indicates a type of a signal included in the MPEG-2 TS packet and is used to decode the PES packet when the MPEG-2 TS packet is demultiplexed.

DMB data is formed by packing the multiplexed MPEG-2 TS data in a European Research Coordination Agency Project-147 (Eureka-147) stream mode, which is a DMB transmission mode, in step 207.

Thus, in the present invention, in order to retransmit the DMB data as a signal of a different protocol, an apparatus for releasing the Eureka-147 stream mode and transmitting an MPEG-2 TS to a terminal, which can transmit packet-based data but cannot receive a DMB signal, using a packet-based transmission protocol is suggested. Although Ethernet is illustrated as the packet-based transmission protocol in the present invention, the present invention is not limited to this, and IEEE 1394, Bluetooth, Zigbee, or WLAN can also be used.

Figure 3:
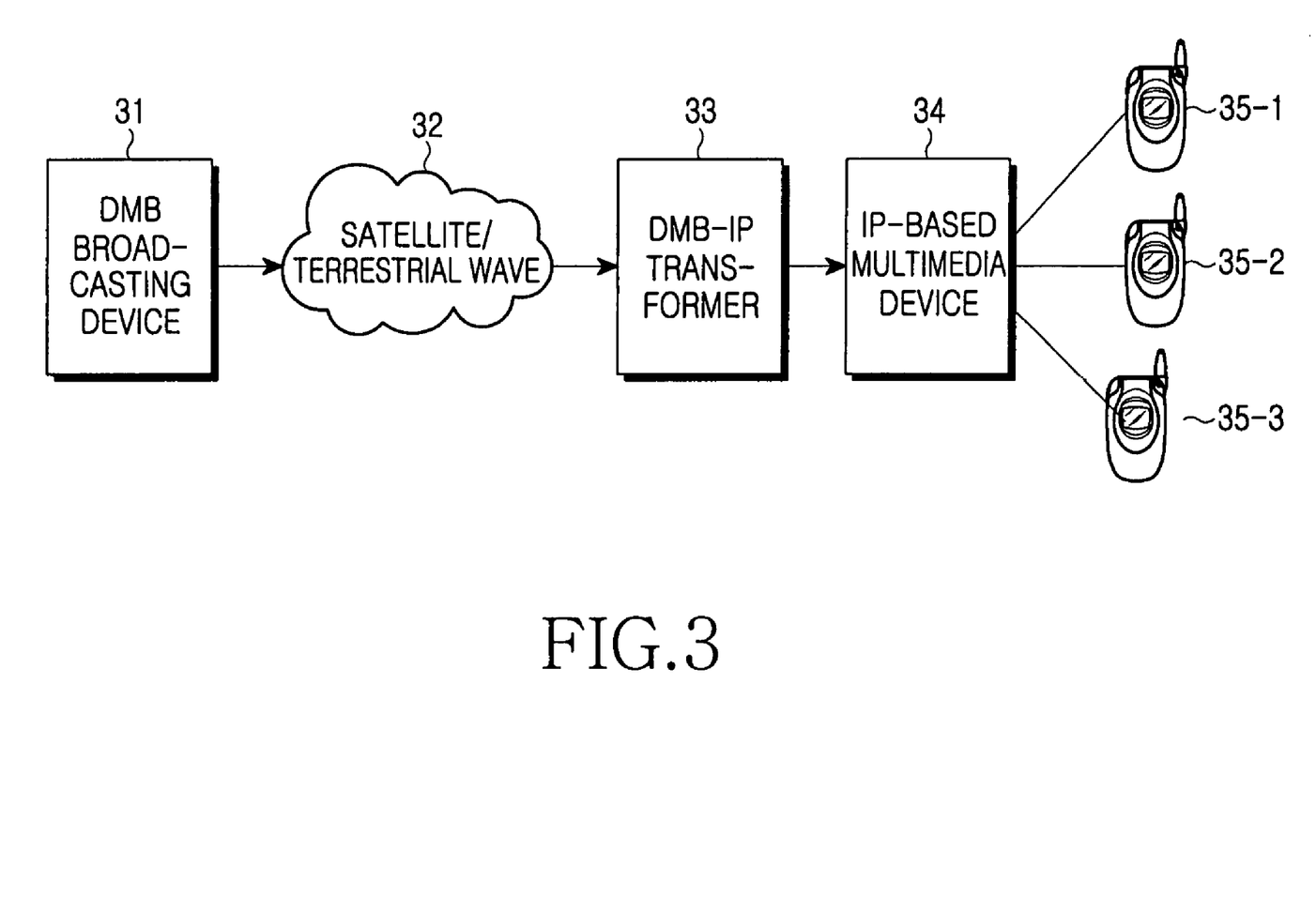
FIG. 3 is a schematic configuration of a retransmission system using a packet method for a DMB service according to a preferred embodiment of the present invention.

FIG. 3 is a schematic configuration of a retransmission system using a packet method for a DMB service according to a preferred embodiment of the present invention.

Referring to FIG. 3, the retransmission system includes a DMB broadcasting device 31, a satellite/terrestrial wave 32, a DMB-IP transformer 33, an IP-based multimedia transmission device 34 and a plurality of user devices 35-1, 35-2, and 35-3. The broadcasting device 31 received produced multimedia data from content providers (not shown), forms DMB data for DMB transmission from the received multimedia data, and transmits the DMB data to satellite/terrestrial wave 32. Satellite/terrestrial wave 32 is a transfer medium through which the DMB data transmitted from the DMB broadcasting device 31 is transferred. The DMB-IP transformer 33 receives the DMB data via the satellite/terrestrial wave 32 and transforms the received DMB data to packet-based multimedia data. The IP-based multimedia transmission device 34 transmits the packet-based multimedia data, transformed by the DMB-IP transformer 33, to user devices 35-1, 35-2, and 35-3.

The DMB broadcasting device 31 includes a broadcasting center (not shown) for receiving produced multimedia data from content providers and forming DMB data for DMB transmission, transmission facilities (not shown) for transmitting the DMB data formed by the broadcasting center, and gap fillers (not shown) for re-transmitting the DMB data to remove DMB broadcasting shadow areas.

Each of the user devices 35-1, 35-2, and 35-3 is a terminal device that cannot directly receive DMB data, and corresponds to devices which can process packet-based data.

The IP-based multimedia transmission device 34 receives desired channel information, in an upstream direction, from each of the user devices 35-1, 35-2, and 35-3 and transmits packet-based multimedia data transformed by the DMB-IP transformer 33, in the downstream direction, to the user devices 35-1, 35-2, and 35-3 according to the received channel information.

The user devices 35-1, 35-2, and 35-3 independently receive relevant multimedia data. According to the present invention, a unicast transmission method for providing multimedia data of all channels to each of the user devices 35-1, 35-2, and 35-3 is used. Thus, the IP-based multimedia transmission device 34 can reduce a load such as zapping. Furthermore, even if the user devices 35-1, 35-2, and 35-3 are one-way receivers, the user devices 35-1, 35-2, and 35-3 can receive multimedia data, in accordance with the principles of the invention. In contrast, prior art one-way receiver devices cannot receive multimedia data, as these devices cannot select a channel.

In order to achieve the IP multicasting, it is necessary to assign a bandwidth suitable for a transmission network when all channel data of DMB-IP multimedia data is multicasted. In addition, for a wireless IP network in which many errors occur in a transmission channel, data transmission through more efficient multicasting is required.

Thus, in the present invention, an apparatus for slicing all channel data into a proper length according to a network environment, combining the sliced data, creating the combined data as a single piece of multicasting data, and transmitting the created multicasting data will be described.

In a process of transforming an H.264 video signal and a BSAC audio signal having the hierarchical structure for DMB data transmission of a DMB system, which is illustrated in FIG. 2, to IP-based packet data, it is necessary to slice each signal into a proper length for multicasting and insert the sliced data into a single piece of multicasting data.

Accordingly, the H.264 video signal is divided into, and transmitted, as slices of a known length. By dividing each video signal into slices having a known length, and by combining the sliced data of a plurality of channels a bandwidth suitable for a network environment of each channel can be supported. Even when errors occur, the multicasting data transmitted over a plurality of channels prevents the same error from being spread to other data slices in the same channel.

Figure 4:
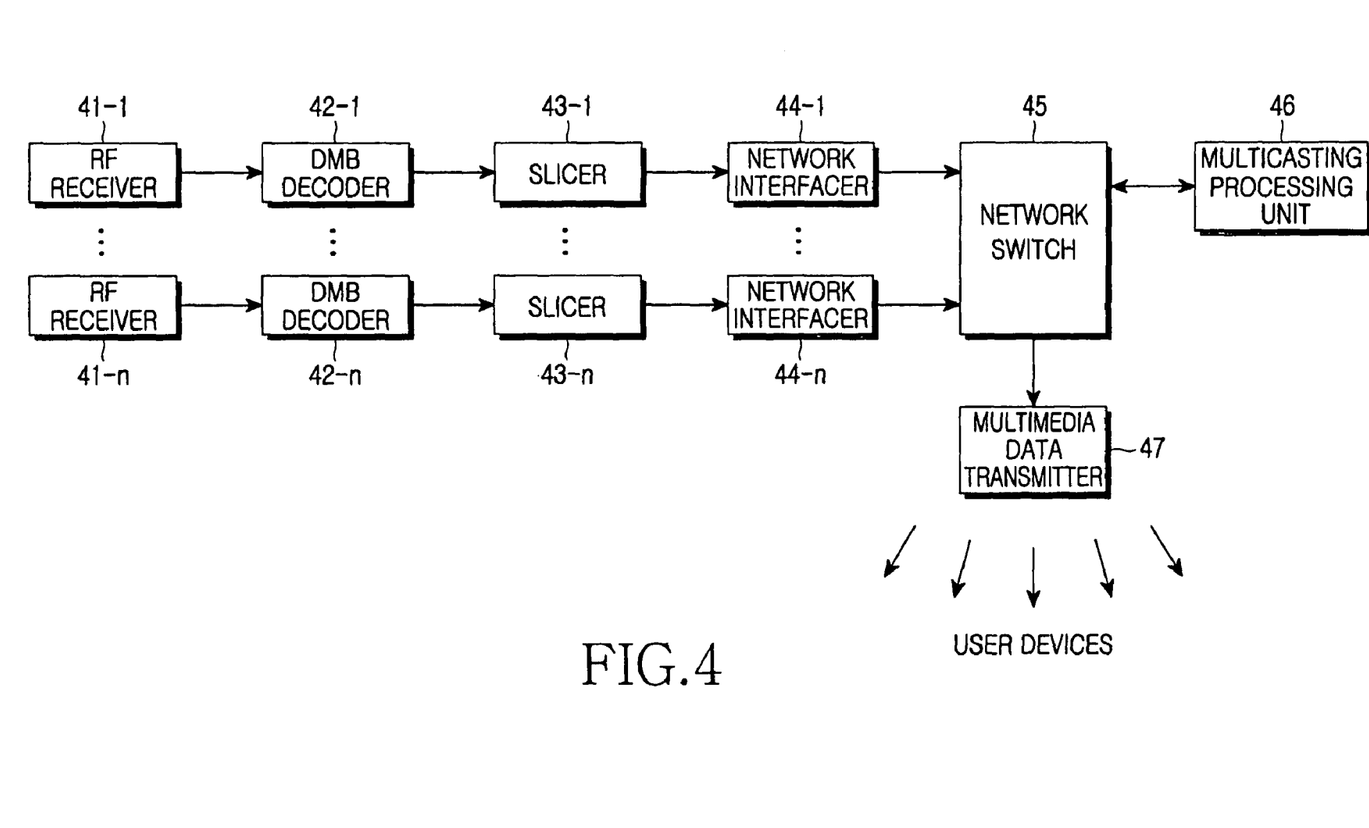
FIG. 4 is a block diagram of a retransmission apparatus using an IP multicasting method for a DMB service according to a preferred embodiment of the present invention.

FIG. 4 is a block diagram of a retransmission apparatus using an IP multicasting method for a DMB service according to a preferred embodiment of the present invention.

Referring to FIG. 4, the retransmission apparatus includes a plurality of radio frequency (RF) receivers 41-1 to 41-n, each for receiving a DMB RF signal of an associated channel, a plurality of DMB decoders 42-1 to 42-n, each for outputting a transport stream (TS) by decoding the DMB RF signal received from an associated RF receiver, a plurality of slicers 43-1 to 43-n, each for slicing the TS input from a corresponding DMB decoder, a plurality of network interfacers 44-1 to 44-n, each for IP packetizing the TS sliced by a corresponding slicer, a network switch 45 for receiving the IP packets from the plurality of network interfacers 44-1 to 44-n, transferring the received IP packets to a multicasting processing unit 46, and transferring multicasting data input from the multicasting processing unit 46 to a multimedia data transmitter 47, a multicasting processing unit 46 for receiving the IP packets from the network switch 45, creating a single piece of multicasting data using the received IP packets, and outputting the created multicasting data back to the network switch 45, and a multimedia data transmitter 47 for receiving the multicasting data via the network switch 45 and multicasting the received multicasting data to user devices.

The network switch 45 transfers signals received from the network interfacers 44-1 to 44-n to the multicasting processing unit 46 and transfers a signal received from the multicasting processing unit 46 to the multimedia data transmitter 47. That is, the multicasting data can be transmitted by assigning multicasting destination addresses to the signals having general destination addresses, which are received from the network interfacers 44-1 to 44-n.

Figure 5:
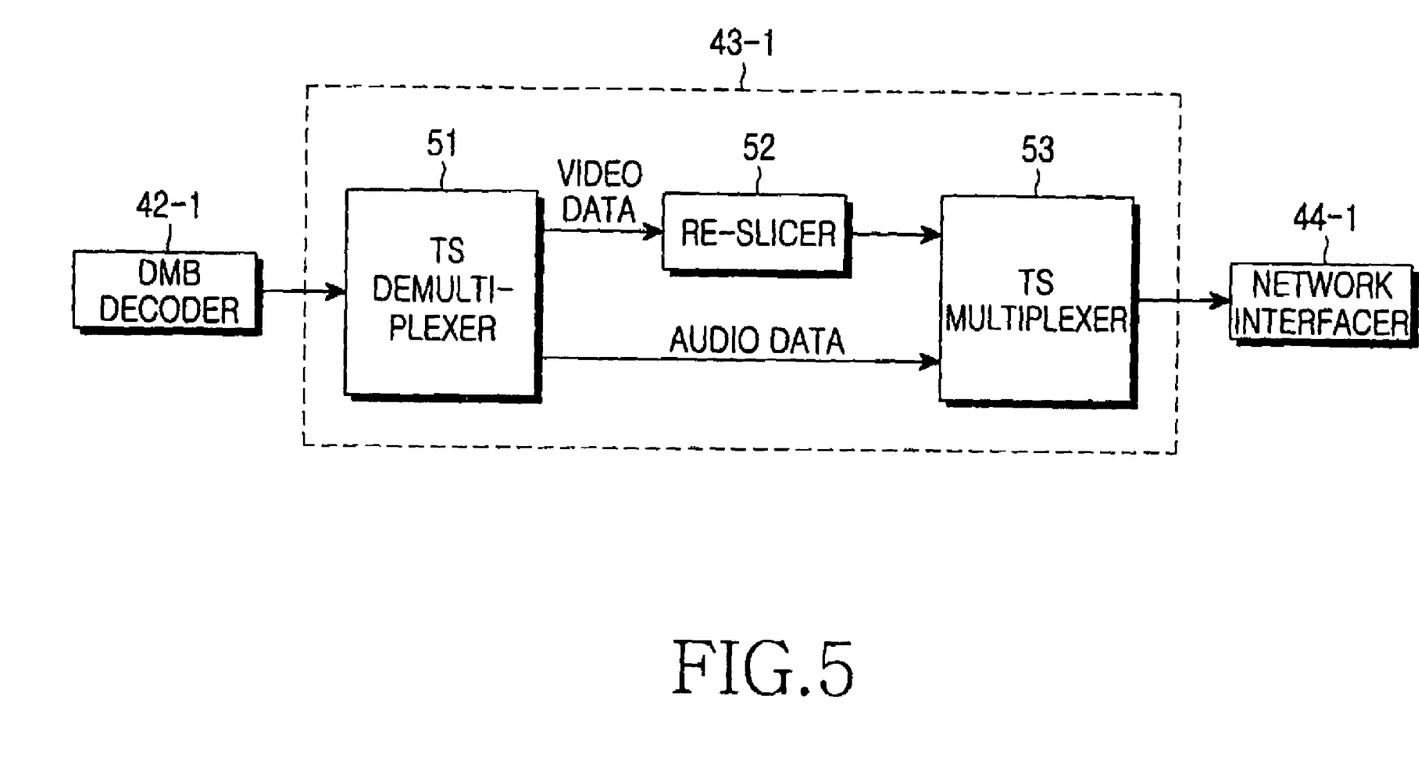
FIG. 5 is a block diagram of a slicer of a retransmission apparatus using an IP multicasting method for a DMB service according to a preferred embodiment of the present invention.

FIG. 5 is a block diagram of a slicer 3-1 of a retransmission apparatus using an IP multicasting method for a DMB service according to a preferred embodiment of the present invention.

FIG. 5 is a detailed block diagram of the slicer 43-1 illustrated in FIG. 4, wherein the other slicers 43-2 to 43-n have the same configuration and the discussion made with regard to slicer 43-1 is applicable to the other slicers. Referring to FIG. 5, the slicer 43-1 includes a TS demultiplexer 51 for demultiplexing the TS input from the DMB decoder 421 into a video signal, an audio signal, and a data signal. The video data is applied to re-slicer 52 for encoding the video signal into a predetermined slice of known size, and a TS multiplexer 53 for multiplexing the video signal input from the re-slicer 52 and the audio signal and the data signal input from the TS demultiplexer 51.

An operation of the retransmission apparatus will now be described with reference to FIGS. 4 and 5.

A DMB RF signal received by each of the RF receivers 41-1 to 41-n is output as a TS signal containing an H.264 video signal and a BSAC audio signal by each of the DMB decoders 42-1 to 42-n. The TS signal is demultiplexed into a H.264 video signal, a BSAC audio, and data signals by the corresponding TS demultiplexer 51. The BSAC audio and data signals are directly input to the TS multiplexer 53, and the H.264 video signal is divided into slices by the re-slicer 52 and then input to the TS multiplexer 53. The re-slicer 52 determines a slice unit so that each slice has a length according to a characteristic of a wireless network through which the DMB service is provided, and divides the H.264 video signal based on the determined slice unit. The TS multiplexer 53 multiplexes the H.264 video signal and the audio and data signals into a TS signal by synchronizing the signals. The TS signal output from the TS multiplexer 53 is IP encapsulated by a corresponding network interfacer 44-1 to 44-n. In the IP encapsulation process, a source address is set to identify channel information selected by each of the RF receivers 41-1 to 41-n, and a destination address is set as an arbitrary value. Since the destination address is set by the multicasting processing unit 46, the destination address set by each of the network interfacers 44-1 to 44-n is meaningless. DMB signals generated as IP-based data by the network interfacers 44-1 to 44-n are transferred to the multicasting processing unit 46 via the network switch 45, the multicasting processing unit 46 creates multicasting data by assigning a multicasting address as a destination address to the IP-based data, and the multicasting data is transferred to the multimedia data transmitter 47 via the network switch 45 and multicasted to user devices.

Figure 6:
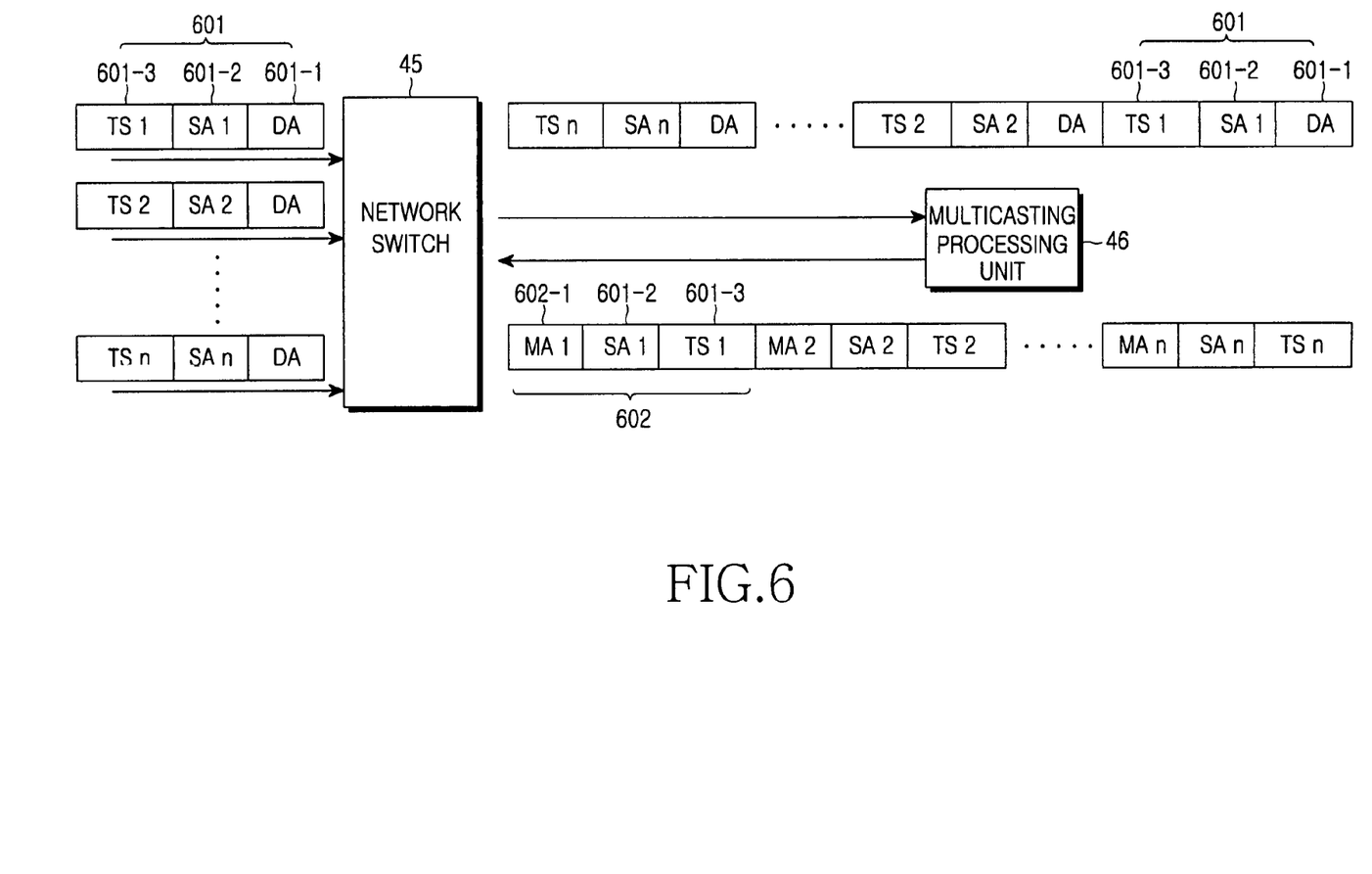
FIG. 6 illustrates a multicasting address assigned by a retransmission apparatus using an IP multicasting method for a DMB service according to a preferred embodiment of the present invention.

FIG. 6 illustrates a multicasting address assigned by a retransmission apparatus using an IP multicasting method for a DMB service according to a preferred embodiment of the present invention.

Referring to FIG. 6, each IP packet 601 input to the network switch 45 from each of the network interfacers 44-1 to 44-n includes a destination address 601-1, a source address 601-2, and a TS 601-3. The destination address 601-1 has an arbitrary value as described above, and the source address 601-2 is set to identify channel information selected by each of the RF receivers 41-1 to 41-n.

Each IP packet 601 is provided to the multicasting processing unit 46 via the network switch 45, which generates a multicasting signal 602. The generated multicasting signal 602 includes a valid multicasting address 602-1, the source address 601-2, and the TS 601-3.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software instruction or computer code that when accessed and executed by the computer, processor or hardware implementation executes the processing methods described herein.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A retransmission apparatus using an (Internet Protocol) IP multicasting method for a Digital Multimedia Broadcasting (DMB) service, comprising:
   a plurality (n) of radio frequency (RF) receivers, each for receiving a DMB RF signal of DMB broadcast data of an associated channel;
   a plurality (n) of DMB decoders, each for outputting a transport stream (TS) by decoding the DMB RF signal of an associated channel received from a relevant RF receiver;
   a plurality (n) of slicers, each for processing the TS input from an associated DMB decoder;
   a plurality (n) of network interfacers, each for IP packetizing the TS sliced by a corresponding slicer;
   a network switch for receiving the IP packets from the plurality (n) of network interfacers, multiplexing the received IP packets, and, transferring the multiplexed IP packets to a multicasting processing unit; and
   the multicasting processing unit for receiving the IP packets from the network switch, creating a single piece of multicasting data by assigning multicasting addresses to the received IP packets, and outputting the created multicasting data to the network switch,
   wherein multicasting data includes a source address set to identify channel information selected by each of the plurality (n) of RF receivers,
   wherein each of the plurality (n) of slicers comprises:
   a TS demultiplexer for demultiplexing the TS from a corresponding DMB decoder into a video signal, an audio signal, and a data signal;
   a re-slicer for parsing only the video signal from among the video signal, audio signal and data signal from among the TS, and for encoding only the parsed video signal on a basis of a predetermined slice of a known size; and
   a TS multiplexer for multiplexing the parsed and encoded video signal received from the re-slicer with the audio signal and data signal received from the TS demultiplexer;
   wherein the DMB broadcast data transmitted by the DMB service and received by the plurality of RF receivers is retransmitted as multicasted channel data of DMB-IP multimedia data.

2. The retransmission apparatus of claim 1, further comprising a multimedia data transmitter for receiving the multicasting data via the network switch and multicasting the received multicasting data to user devices.

3. The retransmission apparatus of claim 1, wherein the re-slicer determines a slice unit of the video signal according to a state of a transmission network through which the IP packet service is provided.

4. A method for retransmission of a Digital Multimedia Broadcasting (DMB) service using an (Internet Protocol) IP multicasting, the method comprising the steps of:
   receiving a DMB radio frequency (RF) signal of DMB broadcast data on a corresponding channel at each of a plurality (n) of radio frequency (RF) receivers;
   decoding the DMB RF signal received from a corresponding channel and outputting a transport stream (TS);
   demultiplexing the TS into a video signal, an audio signal, and a data signal;
   re-slicing the video signal of the demultiplexed TS received from a corresponding channel by a re-slicer unit and parsing only the video signal from among the video signal, audio signal and a data signal from among the TS, and for encoding only the parsed video signal on a basis of a predetermined slice of a known size;
   IP packetizing the sliced TS from the corresponding channel;
   multiplexing the IP packets by a network switch;
   transferring the multiplexed IP packets to a multicasting processing unit; and
   creating a single piece of multicasting data by assigning multicasting addresses to the received IP packets, and outputting the created multicasting data, wherein the DMB broadcast data transmitted by the DMB service and received by the plurality of RF receivers is retransmitted as multicasted channel data of DMB-IP multimedia data; and
   wherein multicasting data includes a source address set to identify channel information selected by each of the plurality (n) of RF receivers.

5. The method of claim 4, further comprising the step of: multicasting the received multicasting data.

6. The method of claim 4, wherein the step of re-slicing comprises the step of:
   multiplexing the parsed video signal from the re-slicer and the audio signal and data signal from the step of demultiplexing the TS.

7. The method of claim 6, wherein the step of slicing comprises the step of:
   determining a slice unit value of the video signal according to a state of a transmission network through which the IP packet service is provided.

8. An Internet Protocol (IP) multicasting retransmitter for Digital Multimedia Broadcasting (DMB) service using an (Internet Protocol) IP, said IP multicasting retransmitter comprising:
   a multicast processing unit in communication with a network switch, said multicast processing unit receiving multiplexed IP packets by the network switch, creating a single piece of multicasting data by assigning multicasting addresses to the received IP packets, and outputting the created multicasting data back to the network switch, and
   a plurality of data processing units in communication with the network switch, each data processing unit comprising:
   an radio frequency (RF) receiver for receiving a DMB RF signal of DMB broadcast data from an associated channel;
   a DMB decoder, in communication with the RF receiving, for outputting a transport stream by decoding a received DMB RF signal;
   a slicer module, in communication with the decoder, for slice processing an input from the decoder into a known size;
   an interfacer, in communication with the slicer, for IP packetizing the signal of known size;
   wherein said slicer module includes a transport stream (TS) demultiplexer for demultiplexing the transport stream into a video signal, an audio signal, and a data signal and a re-slicer for parsing only the video signal from among the demultiplexed signals and encoding the parsed video signal on a basis of a predetermined slice of a known size, wherein the DMB broadcast data transmitted by the DMB service and received by the RF receivers retransmitted as multicasted channel data of DMB-IP multimedia data; and wherein multicasting data include a source address set to identify channel information selected by each of the RF receiver.

9. The retransmitter of claim 8, wherein the slicer module further comprises:

a TS multiplexer for multiplexing the video signal input from the re-slicer and the audio signal and the data signal input from the TS demultiplexer.

10. The retransmitter of claim 9, wherein the re-slicer determines a slice unit of the video signal according to a state of a transmission network through which the IP packet service is provided.

11. The retransmitter of claim 8, wherein the slicer comprises:

a processor in communication with a memory, the processor executing software instructions for:

demultiplexing the TS input into a video signal, an audio signal, and a data signal;

multiplexing the video signal input from the re-slicer and the audio signal and the data signal input from the TS demultiplexer.

12. The retransmiter of claim 11, wherein the processor further executes software instructions for:

determining a slice unit value of the video signal according to a state of a transmission network through which the IP packet service is provided.

* * * * *